United States Patent

Bhattacharyya et al.

(10) Patent No.: US 10,379,850 B2
(45) Date of Patent: Aug. 13, 2019

(54) SOFTWARE PROJECT ESTIMATION

(71) Applicant: TATA CONSULTANCY SERVICES LIMITED, Mumbai, Maharashtra (IN)

(72) Inventors: Pranabendu Bhattacharyya, West Bengal (IN); Sharmila Das, West Bengal (IN)

(73) Assignee: TATA CONSULTANCY SERVICES LIMITED (IN)

(*) Notice: Subject to any disclaimer, the term of this patent is extended or adjusted under 35 U.S.C. 154(b) by 0 days.

(21) Appl. No.: 14/208,039

(22) Filed: Mar. 13, 2014

(65) Prior Publication Data

US 2015/0121332 A1 Apr. 30, 2015

(30) Foreign Application Priority Data

Oct. 25, 2013 (IN) .......................... 3381/MUM/2013

(51) Int. Cl.
  *G06F 9/44* (2018.01)
  *G06F 8/77* (2018.01)
  *G06Q 10/06* (2012.01)
(52) U.S. Cl.
  CPC .............. *G06F 8/77* (2013.01); *G06Q 10/06* (2013.01)
(58) Field of Classification Search
  CPC ........................................................ G06F 8/70
  See application file for complete search history.

(56) References Cited

U.S. PATENT DOCUMENTS

| | | | |
|---|---|---|---|
| 7,873,531 B2* | 1/2011 | Starkey | 705/7.23 |
| 8,464,263 B2* | 6/2013 | Lotlikar | G06F 9/5027 718/102 |
| 8,818,756 B1* | 8/2014 | Keenan | G06Q 10/06312 702/179 |
| 2003/0018952 A1* | 1/2003 | Roetzheim | G06F 8/20 717/101 |
| 2003/0225470 A1* | 12/2003 | Demetriou et al. | 700/100 |
| 2004/0181471 A1* | 9/2004 | Rogers | 705/31 |
| 2006/0041857 A1* | 2/2006 | Huang | G06F 11/3616 717/104 |

(Continued)

OTHER PUBLICATIONS

Wu; The Comparison of the Software Cost Estimating Methods; Mar. 4, 1997.

*Primary Examiner* — Lewis A Bullock, Jr.
*Assistant Examiner* — Mohammad H Kabir
(74) *Attorney, Agent, or Firm* — Barnes & Thornburg LLP

(57) ABSTRACT

A system and a method related to software project estimation. The method receives a value corresponding to at least one decision parameter including a project type, a technology, a software development life cycle (SDLC) type and a stage of the software project from user. The received value is mapped with techniques associated with each of estimation parameters including a size parameter, an effort parameter, a cost parameter, and a schedule parameter in a decision matrix. Based on the mapping, one or more techniques for each estimation parameter are shortlisted, and a success rating factor for each shortlisted technique is evaluated based on historical data to identify a primary set of techniques. Compatibility of the primary set of techniques is then determined based on an interoperability factor to identify at least one secondary set of techniques providing optimum estimate of the software project.

9 Claims, 4 Drawing Sheets

(56) References Cited

U.S. PATENT DOCUMENTS

| | | | |
|---|---|---|---|
| 2008/0092120 A1* | 4/2008 | Udupa et al. | 717/124 |
| 2008/0313110 A1* | 12/2008 | Kreamer | G06Q 10/06 706/12 |
| 2008/0313595 A1* | 12/2008 | Boulineau | G06F 8/20 717/101 |
| 2009/0006271 A1* | 1/2009 | Crowder | G06Q 40/06 705/36 R |
| 2009/0327915 A1* | 12/2009 | Holdaway et al. | 715/745 |
| 2010/0199258 A1* | 8/2010 | Lindley | G06Q 10/06 717/105 |
| 2011/0112882 A1* | 5/2011 | Summers | G06Q 10/04 705/7.23 |
| 2012/0179511 A1* | 7/2012 | Lee | G06Q 10/06311 705/7.37 |
| 2012/0290359 A1* | 11/2012 | Graham | G06F 17/30699 705/7.32 |
| 2013/0167135 A1* | 6/2013 | Neumann et al. | 717/174 |

* cited by examiner

SOFTWARE PROJECT ESTIMATION

PRIORITY CLAIM

This patent application claims priority to Indian Patent Application No. 3381/MUM/2013, filed 25 Oct. 2013, the disclosure of which is incorporated herein by reference in its entirety.

TECHNICAL FIELD

The present subject matter relates, in general, to software estimation, and, in particular, to a system and a method for software project estimation.

BACKGROUND

Software estimation is a major issue in software project management faced by many organizations. Software estimation involves estimation of resource, such as man hours and computation resources that may be required to develop particular software. The software estimation problem is highly complex, particularly since the relationships between software output metrics and contributing factors generally exhibit strong, complex, non-linear characteristics. Few software estimation models have been developed in the past to facilitate monitoring, control, and assessment of software projects.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
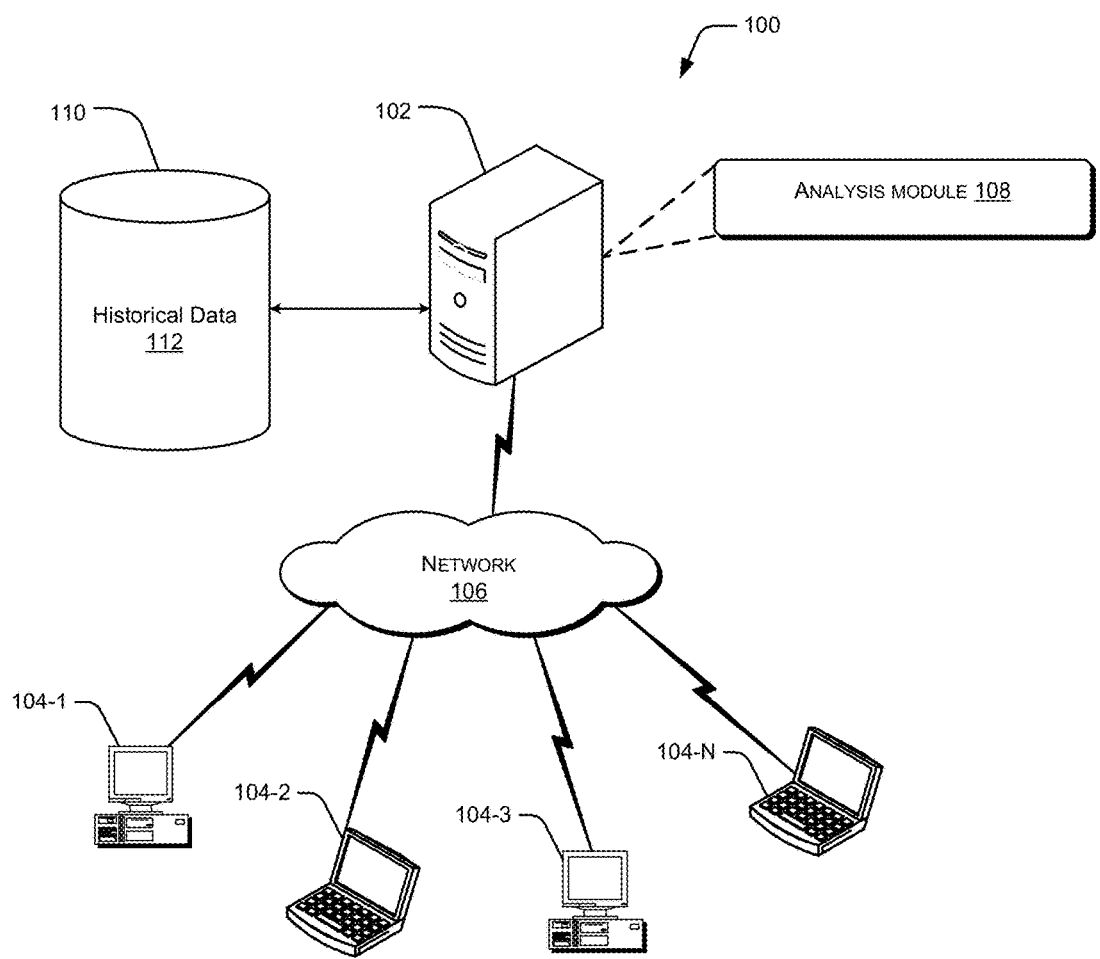
FIG. 1 illustrates a network environment implementing a software estimation system, according to an embodiment of the present subject matter.

Conventionally, few software estimation techniques have been developed to facilitate monitoring, control, and assessment of software projects. However, such conventional software estimation techniques fail to consider all the relevant parameters, such as project size, effort, schedule and cost collectively to arrive at a set of techniques that in combination provide a reasonable estimate of the software projects. Further, such conventional techniques make either a limited or no reuse of past organizational experience in estimation.

Furthermore, such techniques are capable of providing estimation for certain specific types of projects only. However, in a real world scenario, software projects can be of multiple types, such as bespoke application development, large functional enhancement, minor technical enhancement, testing, package implementation and so on. Accordingly, methodologies of estimation for these project types vary, and a software estimation technique applied to one type of software project may typically not work for others. Thus, various issues are often experienced with the use of such conventional software estimation techniques. Issues may be at a project level like incorrect budgeting, incorrect resource loading, issues in tracking/monitoring, etc., or issues may be at an organization level like increased scrap-value of projects, incorrect forecasting of IT budgets and incorrect build-buy decisions.

In accordance with the present subject matter, a system and a method for software project estimation are described. The system and the method integrates all the relevant parameters including project size, effort, schedule, and cost of software estimation in a cohesive manner in collaboration with a multi-dimensional decision matrix to provide a set of techniques that in combination provide an optimum estimate for the software projects.

According to one embodiment, values corresponding to decision parameters are received from a user, such as an estimator. The decision parameters may include, but not limited to, a project type, a technology, a software development life cycle (SDLC) type and a stage of the software project. The received values are mapped with a plurality of techniques associated with estimation parameters in a decision matrix. For example, a value of a decision parameter may be mapped to each of the techniques associated with each of the estimation parameters. The estimation parameters referred herein are the parameters used for estimating the software projects. The estimation parameters may include, but not limited to, a size parameter for estimating size of the software project, an effort parameter for estimating efforts involved in the software project, a cost parameter for estimating cost of the software project, and a schedule parameter for estimating schedule of the software project. In one implementation, the mapping of the values with techniques is performed based on comparison of the values with pre-tagged keywords associated with each of the techniques.

Based on the mapping, one or more techniques amongst the plurality of techniques are shortlisted for each of the estimation parameters. For example, the techniques whose pre-tagged keywords match with the received values are shortlisted. Thereafter, for each of the shortlisted techniques, a success rating factor is evaluated based on a historical data of closed software projects to identify a primary set of techniques. For example, techniques with highest success rating factor are identified as a primary set of techniques.

After obtaining the primary set of techniques, compatibility of the techniques in the primary set is determined based on an interoperability factor, which is indicative of validity of the combination of the techniques. In one implementation, the interoperability between the techniques corresponding to size and effort estimation parameters is determined. Based on the determination, a secondary set of techniques are identified that in combination provides an optimum estimate for the software project. The estimate may include, for example, estimated values for each of the estimation parameters, say, an effort estimate, a cost estimate, a schedule estimate, and a size estimate.

In one implementation, after closure of the software project, actual project data pertaining to the software project is fed into the system as a feedback and stored into a database associated with the system. The feedback comprises, amongst other things, actual project data pertaining to each of the estimation parameters. For example, for estimation parameter 'effort', the actual effort data is obtained and stored into the database as historical data. The data in the database, thus, comprises actual project data and estimated project data. This data is then utilized to refine the estimation process. An exemplary table 1 containing the historical data stored in the database is shown below.

The system 102 may be connected to the user devices 104 over the network 106 through one or more communication links. The communication links between the system 102 and the user devices 104 are enabled through a desired form of communication, for example, via dial-up modem connections, cable links, digital subscriber lines (DSL), wireless, or satellite links, or any other suitable form of communication.

TABLE 1

| Project Name | Project Type | Technology | SDLC Type | Stage | Estimated Size | Estimated Efforts | Estimated Schedule | Actual Size | Actual Efforts | Actual Schedule |
|---|---|---|---|---|---|---|---|---|---|---|
| XYZ | Development | Java | Waterfall | Early | 200 FP | 1800 PH | 2 CM | 210 FP | 2000 PH | 3 CM |
| ABC | Development | .Net | Waterfall | Project Execution | 125 FP | 1500 PH | 2 CM | 140 FP | 1500 PH | 2 CM |
| DEF | Enhancement | .Net | Iterative | Early | 200 FP | 2400 PH | 4 CM | 220 FP | 2400 PH | 4 CM |

As already indicated, the system makes use of organizational historical data for bringing in efficiency in project management. The system is self-sustaining with continuous improvement cycle which captures project end results, and helps to integrate the feedback and best practices back into the system thus enabling further refinement and maturity of the system with increased utilization. The decision matrix along with a feedback mechanism presents a comprehensive estimation approach and a self-refining and evolving ecosystem driving standardization, accuracy and predictability in software estimation.

The following disclosure describes the system and the method for software project estimation. While aspects of the described method and the system can be implemented in any number of different computing systems, environments, and/or configurations, embodiments for analyzing time-series data based on world events derived from unstructured content are described in the context of the following exemplary method(s) and system(s).

FIG. 1 illustrates a network environment 100 implementing a software estimation system 102, in accordance with an embodiment of the present subject matter.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as smart phones.

The software estimation system 102 (hereinafter referred to as system 102) is communicatively connected to a plurality of user devices 104-1, 104-2, 104-3 . . . , and, 104-N, collectively referred to as user devices 104 and individually referred to as a user device 104, through a network 106. In one implementation, a plurality of users, such as estimators may use the user devices 104 to communicate with the system 102. In one implementation, the system 102 is further coupled to a database 110 containing historical data 112 of the closed software projects.

The system 102 and the user devices 104 may be implemented in a variety of computing devices, including, servers, a desktop personal computer, a notebook or portable computer, a workstation, a mainframe computer, a laptop and/or communication device, such as mobile phones and smart phones. Further, in one implementation, the system 102 may be a distributed or centralized network system in which different computing devices may host one or more of the hardware or software components of the system 102.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such.

According to the present subject matter, the system 102 obtains values of the decision parameters pertaining to a software project from a user. The decision parameters include at least a project type, a technology, a SDLC type and a stage of the software project. Additionally, the decision parameters may include other parameters relating to software project that are known to impact the software estimation. The system 102 maps the values to a plurality of techniques associated with estimation parameters in a decision matrix. The decision matrix referred herein comprises decision parameters described above and estimations parameters including, but not limited to, size, effort, cost, and schedule. Such a decision matrix is created by experts and is utilized to identify techniques that provides optimum estimate for a software project.

The mapping is performed based on comparison of the values with keywords associated with the plurality of techniques. As a result of the mapping, the system 102 shortlists one or more techniques amongst the plurality of techniques for each of the estimation parameters. The shortlisted techniques are subsequently reflected in a decision matrix.

For each of the shortlisted techniques, the system 102 evaluates a success rating factor based on the historical data 112 of closed software projects to identify a primary set of techniques. For this purpose, the system 102 comprises an analysis module 108 that evaluates the success rating factor and identifies the primary set of techniques. Subsequently, the analysis module 108 determines compatibility of the techniques in the primary set based on an interoperability factor. The interoperability factor as referred herein is indicative of validity of the combination of the techniques in the primary set. Based on the determination, the analysis module 108 identifies a secondary set of techniques from the primary set, whereby the secondary set of techniques in combination provides an optimum estimate for the software project.

Different components of the system 102 and the manner in which such components interact to perform the software project estimation are explained in greater detail with reference to the FIG. 2.

Figure 2:
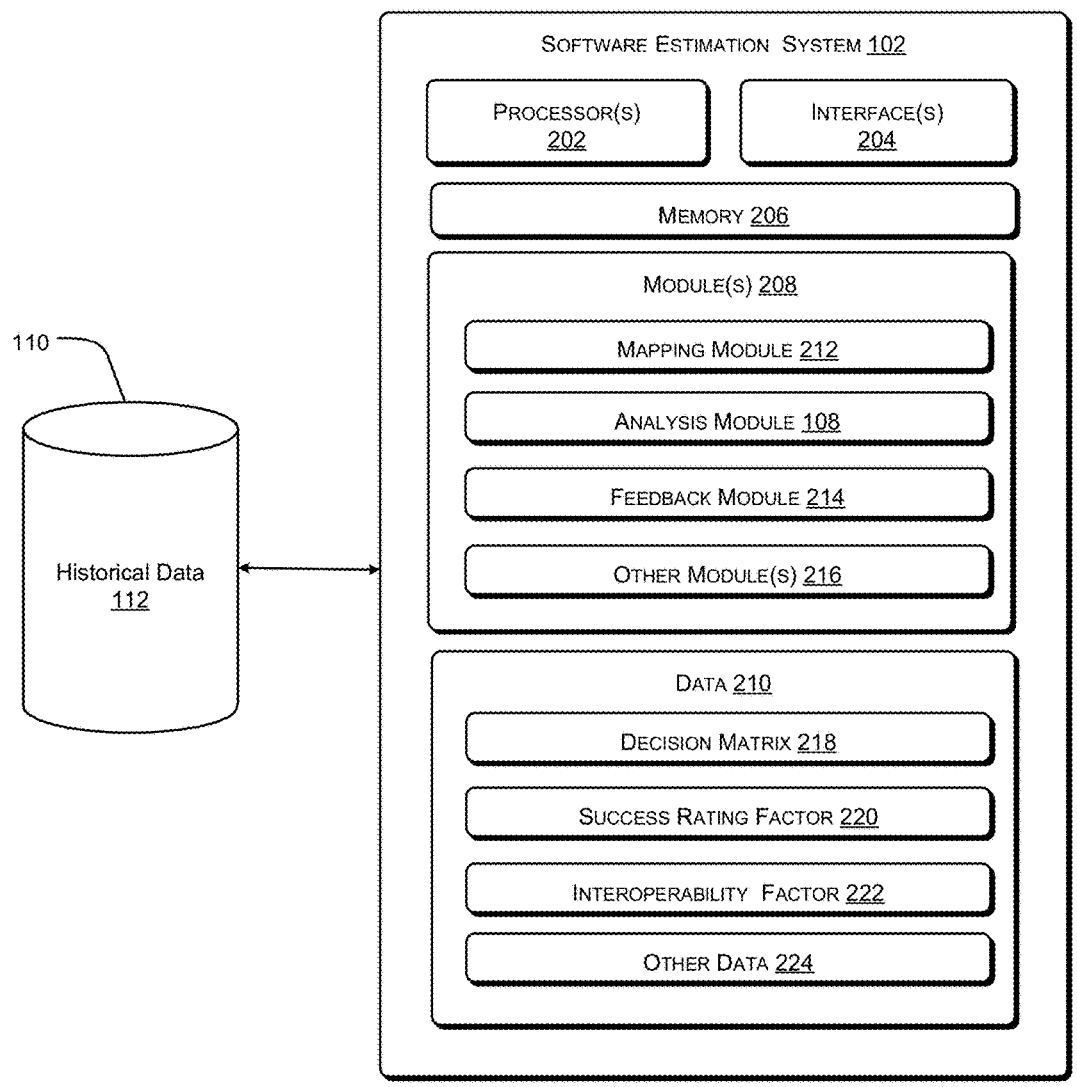
FIG. 2 illustrates components of the software estimation system, according to an embodiment of the present subject matter.

As shown in the FIG. 2, the system 102 includes one or more processor(s) 202, interface(s) 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions and data stored in the memory 206.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

The interface(s) 204 may include a variety of software and hardware interfaces, for example, interface for peripheral device(s), such as a keyboard, a mouse, an external memory, and a printer. Further, the interface(s) 204 may enable the system 102 to communicate over the network 106, and may include one or more ports for connecting the system 102 with other computing devices, such as web servers and external databases. The interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The system 102 also includes module(s) 208 and data 210.

The module(s) 208 include routines, programs, objects, components, data structures, etc., which perform particular tasks or implement particular abstract data types. The module(s) 208 further include, in addition to the analysis module 108, a mapping module 212, a feedback module 214, and other module(s) 216.

The data 210 serves, amongst other things, as a repository for storing data processed, received and generated by one or more of the modules 208. The data 210 includes decision matrix 218, success rating factor 220, interoperability factor 222, and other data 224. The other data 224 includes data generated as a result of the execution of the other module(s) 216.

According to one embodiment, the mapping module 212 of the system 102 receives values corresponding to decision parameters pertaining to a software project from a user, such as an estimator. Examples of the decision parameters include at least a project type, a technology, a SDLC type, and a stage of the software project. After receiving the values, the mapping module 212 maps the values to a plurality of techniques associated with estimation parameters in the decision matrix 218 to shortlist one or more techniques amongst the plurality of techniques for each of the estimation parameters. The values may be in the form of keywords. As an example, a value 'development' may be received for the decision parameter 'project type'. The estimation parameters include, but not limited to, size, effort, cost, and schedule. The decision matrix 218 referred herein comprises the decision parameters and the estimations parameters.

Figure 3:
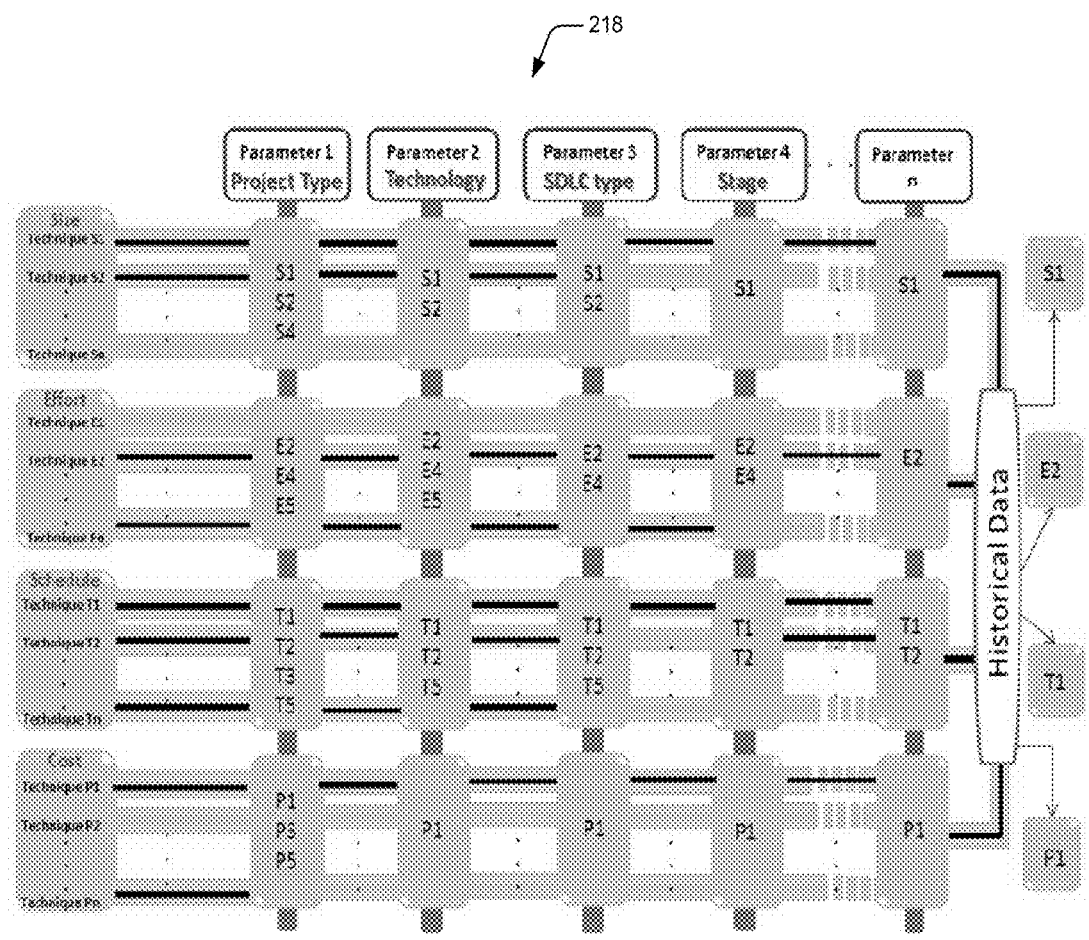
FIG. 3 illustrates a decision matrix, according to an embodiment of the present subject matter.

An exemplary decision matrix 218 has been illustrated in the FIG. 3. As shown in the FIG. 3, the decision matrix 218 includes decision parameters 'project type', 'technology', 'SDLC type', 'Stage' . . . n, and the estimation parameters include 'size', 'effort', 'schedule' and 'cost'. Each of the estimation parameters multiple techniques associated therewith. For example, techniques S1, S2, . . . Sn are associated with 'size', techniques E1, E2, . . . En are associated with 'effort', techniques T1, T2, . . . Tn are associated with 'schedule', and techniques P1, P2, . . . Pn are associated with 'cost'.

In said example, assuming that the value for the decision parameter 'project type' is development, 'technology' is Java, 'SDLC type' is waterfall, and 'Stage' is early, the mapping module 212 initially maps the development to the techniques associated with each of the estimation parameters and identifies that the techniques S1, S2 and S4 for size, E2, E4, and E5 for effort, T1, T2, T3, and T5 for schedule, and P1, P3, and P5 for cost are mapping with the development project type. Thereafter, for technology, the mapping module 212 maps Java to the techniques already shortlisted based on the project type. Likewise, the mapping module 212 shortlist the techniques and identify one or more techniques for each of the estimation parameters.

The estimation parameter 'size' as referred herein is indicative of work-volume in terms of a size unit. Examples of the techniques associated with size estimation include both deterministic and probabilistic type of techniques, such as function point, use case point, feature point, and story point. The estimation parameter 'effort' is indicative of effort required to perform SDLC activities, and other additional activities, if any. Examples of the techniques associated with effort include, but not limited to, productivity based effort, Constructive Cost Model (COCOMO), and wideband Delphi. The estimation parameter 'schedule' is indicative of a project schedule. Examples of the techniques associated with schedule include COCOMO II, Gantt chart, etc. The estimation parameter 'cost' is indicative of total cost of the project inclusive of a staffing cost and other associated costs like Network Costs, Hardware costs etc. Some cost calculation techniques include Fixed Cost-Variable Cost method, COCOMO-II etc.

Although the description has been provided with reference to some of the decision parameters and estimation parameters, it is to be understood that other decision parameters and estimation parameters can be incorporated into the decision matrix when required. Also, some of the decision parameters and estimation parameters can be deleted, if required.

As indicated above, the mapping module 212 maps the received values to a plurality of techniques. Such a mapping, in one implementation, is performed based on comparison of the values with keywords associated with the plurality of techniques to shortlist one or more techniques amongst the plurality of techniques. The keywords referred herein may be pre-tagged with techniques by experts, and the tagging can be modified by the experts when required.

Based on the mapping, the mapping module 212 shortlists one or more techniques for each of the estimation parameters. For each of the shortlisted techniques, the analysis module 108 of the system 102 evaluates a success rating factor based on a historical data 112 of closed software projects stored in the database 110 to identify a primary set of techniques. In one implementation, the analysis module 108 stores the success rating factor as the success rating factor 220 within data 210. The success rating factor as referred herein is a function of following attributes:

Success Rating Factor=$F$(Project Effort Variance, Project Size variance, No. of data points, User Feedback, Client Acceptability Factor)

The project effort variance indicated above is a ratio of the difference between actual effort expended in the software project and the estimated effort to the actual effort. The project size variance is a ratio of the difference between actual size delivered in the project and the estimated size to the actual size. The no. of data point is a total number of projects matching the criteria including the decision parameters and the specific technique for the estimation parameter under consideration. In case a minimum threshold of data points is not available for a given set, the number of data points is not considered for evaluation. The user feedback includes feedback regarding technique effectiveness, usability and consistency. The client acceptability factor includes client feedback regarding estimation effectiveness, predictability and accuracy.

For each of the above mentioned attributes, initially, weightages are assigned by experts, and a success rating factor for each of the shortlisted technique is computed based on the weightages. Exemplary weightages and success rating factor is shown in the table 2 below.

TABLE 2

| Attributes | Weightage | Value | Total |
|---|---|---|---|
| Project Effort Variance | 0.2 | 4 | 0.8 |
| Project Size Variance | 0.15 | 4 | 0.6 |
| No. of data points | 0.1 | 4 | 0.4 |
| User Feedback | 0.25 | 3 | 0.75 |
| Client Acceptability Factor | 0.3 | 3 | 0.9 |
| Success Rating Factor | | | 3.45 |

As shown in the table 2, the attribute 'project effort variance' is pre-assigned with a weightage 0.2, the attribute 'project size variance' is pre-assigned with a weightage 0.15, the attribute 'no. of data points' is pre-assigned with a weightage 0.1, the attribute 'user feedback' is assigned with a weightage 0.25, the attribute client acceptability factor is assigned with a weightage 0.3. Based on these weightage, a success rating factor 3.45 is calculated as shown in the table 2 above.

In one implementation, weightages pre-assigned to the attributes are dynamic and can be updated based on feedback obtained after execution and use of the project. Based on the feedback, a value of variance and corresponding weightages are updated. In one implementation, the feedback module 214 receives the feedback pertaining to the attributes based on the values provided in the table 3 below. Subsequently, the feedback module 214 updates the values and weightages of the attributes.

TABLE 3

| Values → | 5 | 4 | 3 | 2 | 1 |
|---|---|---|---|---|---|
| Project Effort Variance | 0-7% | 8-13% | 14-20% | 21-25% | >25% |
| Project Size Variance | 0-7% | 8-13% | 14-20% | 21-25% | >25% |
| No. of data points | >80 | 56-80 | 31-55 | 11-30 | <10 |
| User Feedback | 5 | 4 | 3 | 2 | 1 |
| Client Acceptability Factor | 5 | 4 | 3 | 2 | 1 |

As shown in the table 3, the values for the project effort variance and project size variance can be rated between 5-1 based on variance as 0-7%, 8-13%, 14-20%, 21-25%, or >25%, values for no. of data points can be rated between 5-1 based on no. of data points as >80, 56-80, 31-55, 11-30, and <10. Further, the values for the user feedback and client acceptability factor can be rated between 5-1, where 5 denote higher acceptability.

Based on the success rating factor, the analysis module 108 identifies a primary set of techniques amongst the shortlisted techniques. For example, the techniques with highest success rating factor are identified as the shortlisted techniques. In one example, considering the techniques provided in the table 4, Shortlisting is explained below.

TABLE 4

| Project Type | Stage | Technology | SDLC | Sizing Technique | Success Rating Factor |
|---|---|---|---|---|---|
| Development | Early | Java | Waterfall | Function Points | 3.7 |
| Development | Early | Java | Waterfall | Use Case Points | 3.5 |
| Development | Early | Java | Waterfall | Story Points | 2.8 |
| Development | Early | Java | Waterfall | COSMIC | 3.2 |
| Development | Early | Java | Agile | Function Points | 3.4 |
| Development | Early | Java | Agile | Story Points | 3.6 |
| Development | Early | Java | RUP | Use Case Points | 3.2 |
| Development | Early | Java | RUP | Function Points | 3 |

As shown in the table 4, for the following given set of decision parameters: Project Type='Development', Stage='Early', Technology='JAVA', and SDLC='Waterfall', function points is identified as the highest rated sizing technique.

Once the primary set of techniques are shortlisted based on the success rating factor, the analysis module 108 determines compatibility of the techniques in the primary set based on an interoperability factor. The interoperability factor as referred herein is indicative of validity of the combination of the techniques. For example, the interoperability factor '0' may indicate that the techniques are not compatible, and the interoperability factor '1' may indicate that the techniques are compatible. Value of the interoperability factor is based on presence or absence of the valid combination of the techniques in a validation table. In one implementation, the interoperability factor is stored as interoperability factor 222 within the data 210. An exemplary validation table for determining compatibility of the size and effort techniques is provided below as table 5.

TABLE 5

| Size | Effort |
|---|---|
| Function Points | Productivity Based |
| Use Case Points | Productivity Based |
| Story Points | WBS Based |
| Component Points | WBS Based |
| COSMIC | Productivity Based |
| Components Points | COCOMO |

Each row in the table 5 shown above corresponds to a valid combination of the size-effort techniques. In case a valid combination is not found, the interoperability factor is set to '0'. Otherwise, the interoperability factor is set to '1'. Based on determining the compatibility, one or more secondary set of techniques from the primary set are identified. The analysis module 108, for example, identifies the techniques having interoperability factor '1', i.e., the techniques that are compatible at least size and effort wise. In case the techniques are found to be incompatible, the analysis module 108 identifies the techniques having second highest success rating factor, and look up the compatibility of the same. This process is repeated by the analysis module 108 till a valid combination of the techniques is found. Such a valid combination of the techniques are referred herein as secondary set of techniques that in combination provides an optimum estimate of the software project.

At the closure of the software project, the feedback module 214 receives the feedback related to the software project, such as actual project data, and stores the feedback as historical data 112 within the database 110. In one implementation, the feedback module 214 receives the feedback automatically from a project management system coupled to the system 102 at the closure of the software project. In another implementation, the feedback module 214 receives the feedback manually from the users. As indicated previously, the feedback, thus, obtained is utilized for the refinement of the software estimation process.

Figure 4:
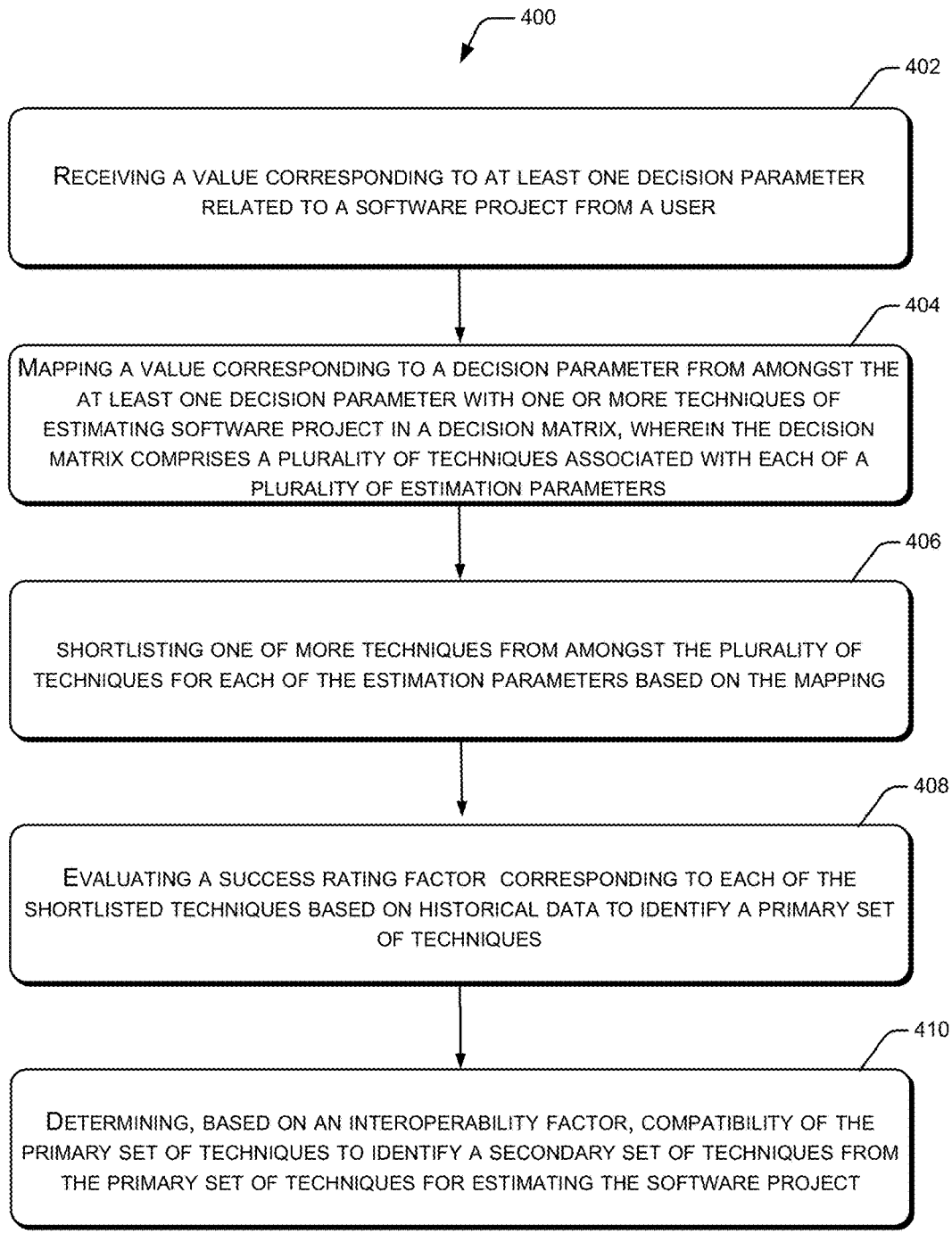
FIG. 4 illustrates a method for software project estimation, according to an embodiment of the present subject matter.

FIG. 4 illustrates a method 400 of software project estimation, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400, or alternative methods. Additionally, individual blocks may be deleted from the methods without departing from the spirit and scope of the subject matter described herein. Furthermore, the method 400 can be implemented in any suitable hardware, software, firmware, or combination thereof.

Referring to FIG. 4, at block 402, the method 400 includes receiving a value corresponding to at least one decision parameter related to a software project from a user. The decision parameter referred herein may include a project type, a technology, a software development life cycle (SDLC) type and a stage. In one implementation, the mapping module 212 of the system 102 receives the value of the at least one decision parameter from the user, such as an estimator.

At block 404, the method 400 includes mapping a value corresponding to a decision parameter from amongst the at least one decision parameter with one or more techniques of estimating software project in a decision matrix. The decision matrix comprises a plurality of techniques associated with each of a plurality of estimation parameters. The estimation parameters include, but not limited to, a size parameter for estimating size of the software project, an effort parameter for estimating efforts involved in the software project, a cost parameter for estimating cost of the software project, and a schedule parameter for estimating schedule of the software project. Such a decision matrix is created by experts and is utilized to identify techniques that collectively provides optimum estimate for the software project. In one implementation, the mapping module 212 maps the value corresponding to a decision parameter with the one or more techniques in a decision matrix.

At block 406, the method includes shortlisting one or more techniques from amongst the plurality of techniques for each of the estimation parameters based on the mapping. In one implementation, the mapping module 212 performs shortlisting of the techniques for each of the estimation parameter based on the mapping.

At block 408, the method 400 includes evaluating a success rating factor corresponding to each of the shortlisted techniques based on historical data to identify a primary set of techniques. In one implementation, the analysis module 108 of the system 102 evaluates the success rating factor and identifies a primary set of techniques amongst a plurality of techniques.

At block 410, the method 400 includes determining, based on an interoperability factor, compatibility of the primary set of techniques to identify a secondary set of techniques that provides a best fit combination and optimum estimates for the software project. In one implementation, the analysis module 108 determines the compatibility of the techniques and identifies the secondary set of techniques.

The system and the method according to the present subject matter integrates all the relevant parameters like project size, effort, schedule, and cost of software estimation in a cohesive manner in collaboration with a decision matrix to provide a set of techniques that in combination provides an optimum estimate for the software projects. Further, the system makes use of organizational historical data to ensure predictability in estimation and for bringing in efficiency in project management. The system is self-sustaining with continuous improvement cycle and captures feedback of the closed projects into the system thus enabling further refinement and maturity of the system with increased utilization.

Although embodiments for software project estimation have been described in language specific to structural features and/or methods, it is to be understood that the invention is not necessarily limited to the specific features or methods described. Rather, the specific features and methods are disclosed as exemplary implementations of software project estimation.

We claim:

1. A method for software project estimation, the method comprising:
receiving, by a processor, a value corresponding to a plurality of decision parameters related to one of multiple software projects from a user, wherein the plurality of decision parameters comprise a software project type, a technology, a software development life cycle (SDLC) type and a stage of the one of the multiple software projects;
mapping, by the processor, a value corresponding to a decision parameter from amongst the plurality of decision parameters with each technique of one or more techniques associated with estimated parameters in a decision matrix, wherein the decision matrix comprises a plurality of techniques associated with each of a plurality of estimation parameters comprising a size parameter indicative of size of the one of the multiple software projects, an effort parameter indicative of efforts involved in the one of the multiple software projects, a cost parameter indicative of cost of the one of the multiple software projects, and a schedule parameter indicative of schedule of the one of the multiple software projects, wherein the mapping of the values with techniques is performed based on the comparison of the values with pre-tagged keywords associated with each technique;

shortlisting, by the processor, one or more techniques amongst the plurality of techniques for each of the estimation parameters based on the mapping, wherein the techniques whose pre-tagged keywords match with the received values are shortlisted;

evaluating, by the processor, a success rating factor corresponding to each of the shortlisted techniques based on historical data of closed software projects to identify a primary set of techniques, wherein evaluating the success rating factor comprises:

dynamically updating values and weightages associated with each of a plurality of attributes of the success rating factor based on the historical data of the closed software projects, wherein a sum of the weightages associated with the plurality of attributes is equal to 1, wherein the plurality of attributes comprises at least a project effort variance, a project size variance, number of data points, a user feedback, and a client acceptability factor, wherein the project effort variance is a ratio of a difference between actual effort expended in the software project and estimated effort and the actual effort, wherein the project size variance is a ratio of a difference between an actual size delivered in the software project and an estimated size and the actual size, wherein the number of data points is a total number of the multiple software projects matching a criteria including the plurality of decision parameters and a specific technique for the estimation parameter under consideration, wherein the user feedback includes feedback regarding technique effectiveness, usability and consistency and wherein the client acceptability factor includes client feedback regarding estimation effectiveness, predictability and accuracy; and evaluating the success rating factor corresponding to each of the shortlisted techniques based on the dynamically updated values and weightages associated with each of the plurality of attributes; and determining, by the processor, based on an interoperability factor, compatibility of the primary set of techniques to identify at least one secondary set of techniques from the primary set of techniques for the one of the multiple software projects, wherein the secondary set of techniques provides an optimum estimate of the one of the multiple software projects, wherein the interoperability factor is indicative of validity of the combination of the techniques.

2. The method as claimed in claim 1, wherein the method further comprises determining the interoperability factor based on determining a valid combination of the primary set of techniques at least related to the size parameter and the effort parameter from a validation table.

3. The method as claimed in claim 1, wherein the historical data comprises at least an actual effort data and an estimated effort data related to the one of the multiple software projects.

4. The method as claimed in claim 1, wherein the method further comprises:

receiving feedback of the one of the multiple software projects from the user, wherein the feedback comprises at least actual project data related to the one of the multiple software projects; and updating the historical data stored in a database with the feedback.

5. A software estimation system comprising:

a processor;

a memory communicatively coupled to the processor, wherein the processor is capable of executing programmed instructions stored in the memory to:

receive a value corresponding to a plurality of decision parameters related to one of multiple software projects from a user, wherein the plurality of decision parameters comprise a software project type, a technology, a software development life cycle (SDLC) type and a stage of the one of the multiple software projects;

map a value corresponding to a decision parameter from amongst the plurality of decision parameters with each technique of one or more techniques associated with estimated parameters in a decision matrix, wherein the decision matrix comprises a plurality of techniques associated with each of a plurality of estimation parameters comprising a size parameter indicative of size of the one of the multiple software projects, an effort parameter indicative of efforts involved in the one of the multiple software projects, a cost parameter indicative of cost of the one of the multiple software projects, and a schedule parameter indicative of schedule of the one of the multiple software projects, wherein the mapping of the values with techniques is performed based on the comparison of the values with pre-tagged keywords associated with each technique;

shortlist one or more techniques amongst the plurality of techniques for each of the estimation parameters based on the mapping, wherein the techniques whose pre-tagged keywords match with the received values are shortlisted; and a mapping module, coupled to the processor, to:

evaluate a success rating factor corresponding to each of the shortlisted techniques based on historical data of closed software projects to identify a primary set of techniques, wherein evaluating the success rating factor comprises:

dynamically updating values and weightages associated with each of a plurality of attributes of the success rating factor based on the historical data of the closed software projects, wherein a sum of the weightages associated with the plurality of attributes is equal to 1, wherein the plurality of attributes comprises at least a project effort variance, a project size variance, number of data points, a user feedback, and a client acceptability factor, wherein the project effort variance is a ratio of a difference between actual effort expended in the software project and estimated effort and the actual effort, wherein the project size variance is a ratio of a difference between an actual size delivered in the software project and an estimated size and the actual size, wherein the number of data points is a total number of the multiple software projects matching a criteria including the plurality of decision parameters and a specific technique for the estimation parameter under consideration, wherein the user feedback includes feedback regarding technique effectiveness, usability and consistency and wherein the client acceptability factor includes client feedback regarding estimation effectiveness, predictability and accuracy; and evaluating the success rating factor corresponding to each of the shortlisted techniques based on the dynamically updated values and weightages associated with each of the plurality of attributes; and determine based on an interoperability factor, compatibility of the primary set of techniques to identify at least one secondary set of techniques from the primary set of techniques for the one of the multiple software projects, wherein the secondary set of techniques provides an optimum estimate of the one of the multiple software projects, wherein the interoperability factor is indicative of validity of the combination of the techniques.

6. The software estimation system as claimed in claim 5, wherein the processor is capable of executing programmed instructions to determine the interoperability factor based on determining a valid combination of the primary set of techniques at least related to the size parameter and the effort parameter from a validation table.

7. The software estimation system as claimed in claim 5, wherein the processor is further capable of executing programmed instructions to:
receive feedback of the one of the multiple software projects from the user, wherein the feedback comprises at least actual project data related to the one of the multiple software projects and
update the historical data stored in the database with the feedback.

8. The software estimation system as claimed in claim 7, wherein the processor is capable of executing programmed instructions to receive the feedback from a project management system.

9. A non-transitory computer-readable medium having embodied thereon a computer program for executing a method comprising:
receiving a value corresponding to a plurality of decision parameters related to one of multiple software projects from a user, wherein the plurality of decision parameters comprise a software project type, a technology, a software development life cycle (SDLC) type and a stage of the one of the multiple software projects;
mapping a value corresponding to a decision parameter from amongst the plurality of decision parameters with each technique of one or more techniques associated with estimated parameters in a decision matrix, wherein the decision matrix comprises a plurality of techniques associated with each of a plurality of estimation parameters comprising a size parameter indicative of size of the one of the multiple software projects, an effort parameter indicative of efforts involved in the one of the multiple software projects, a cost parameter indicative of cost of the one of the multiple software projects, and a schedule parameter indicative of schedule of the one of the multiple software projects, wherein the mapping of the values with techniques is performed based on the comparison of the values with pre-tagged keywords associated with each technique;
shortlisting one or more techniques amongst the plurality of techniques for each of the estimation parameters based on the mapping, wherein the techniques whose pre-tagged keywords match with the received values are shortlisted;
evaluating a success rating factor corresponding to each of the shortlisted techniques based on historical data of closed software projects to identify a primary set of techniques, wherein evaluating the success rating factor comprises:
dynamically updating values and weightages associated with each of a plurality of attributes of the success rating factor based on the historical data of the closed software projects, wherein a sum of the weightages associated with the plurality of attributes is equal to 1, wherein the plurality of attributes comprises at least a project effort variance, a project size variance, number of data points, a user feedback, and a client acceptability factor, wherein the project effort variance is a ratio of a difference between actual effort expended in the software project and estimated effort and the actual effort, wherein the project size variance is a ratio of a difference between an actual size delivered in the software project and an estimated size and the actual size, wherein the number of data points is a total number of the multiple software projects matching a criteria including the plurality of decision parameters and a specific technique for the estimation parameter under consideration, wherein the user feedback includes feedback regarding technique effectiveness, usability and consistency and wherein the client acceptability factor includes client feedback regarding estimation effectiveness, predictability and accuracy; and
evaluating the success rating factor corresponding to each of the shortlisted techniques based on the dynamically updated values and weightages associated with each of the plurality of attributes; and
determining based on an interoperability factor, compatibility of the primary set of techniques to identify at least one secondary set of techniques from the primary set of techniques for the one of the multiple software projects, wherein the secondary set of techniques provides an optimum estimate of the one of the multiple software projects, wherein the interoperability factor is indicative of validity of the combination of the techniques.

* * * * *